A. MÜLLER & C. BOMHARD.
APPARATUS FOR PURIFYING GASES.
APPLICATION FILED DEC. 2, 1909.
1,107,986.
Patented Aug. 18, 1914.
2 SHEETS—SHEET 1.
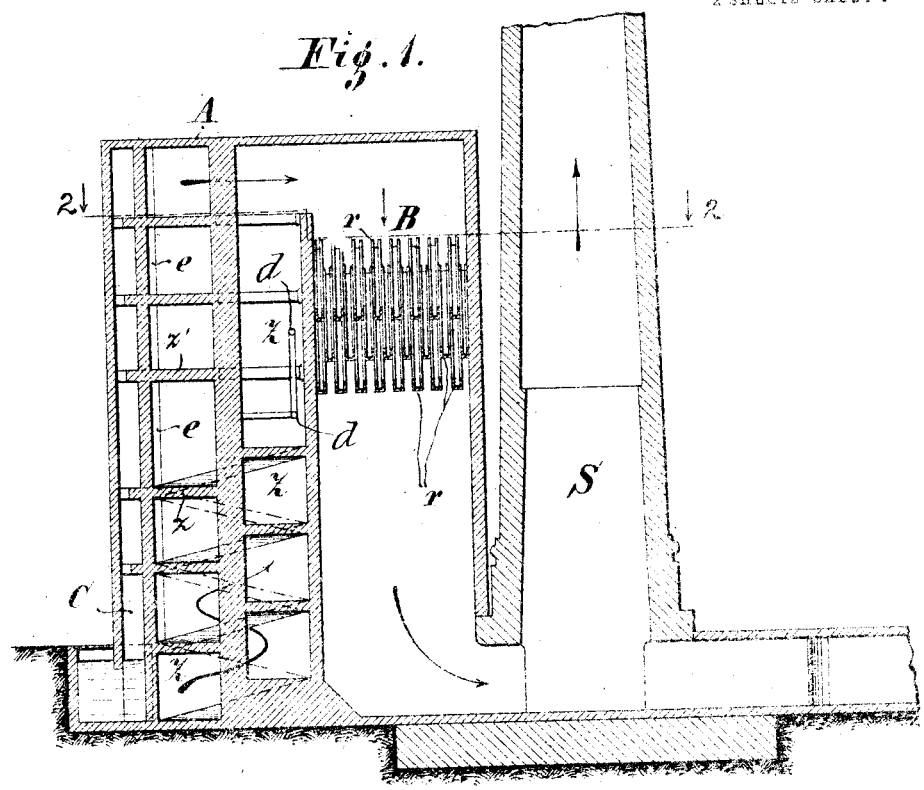
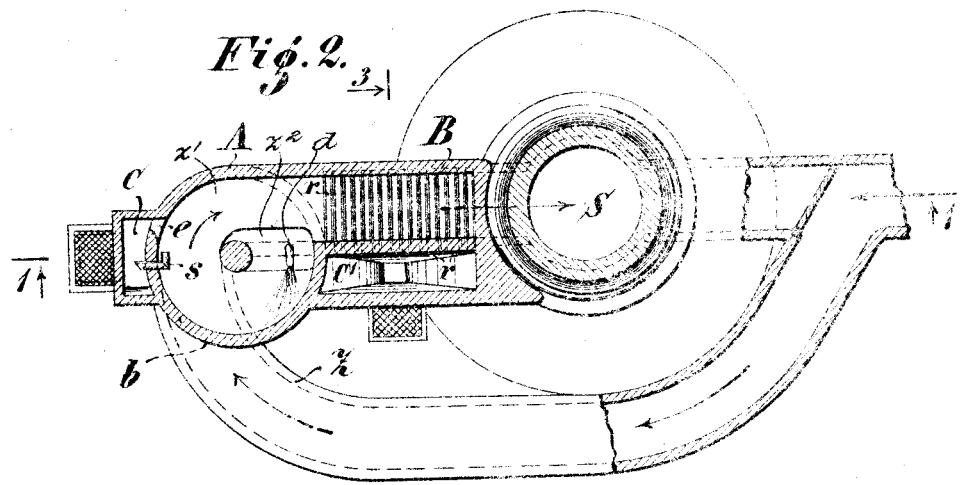
Witnesses
J. Mason
Donald Stewart
Inventors
Arno Müller
Charley Bomhard

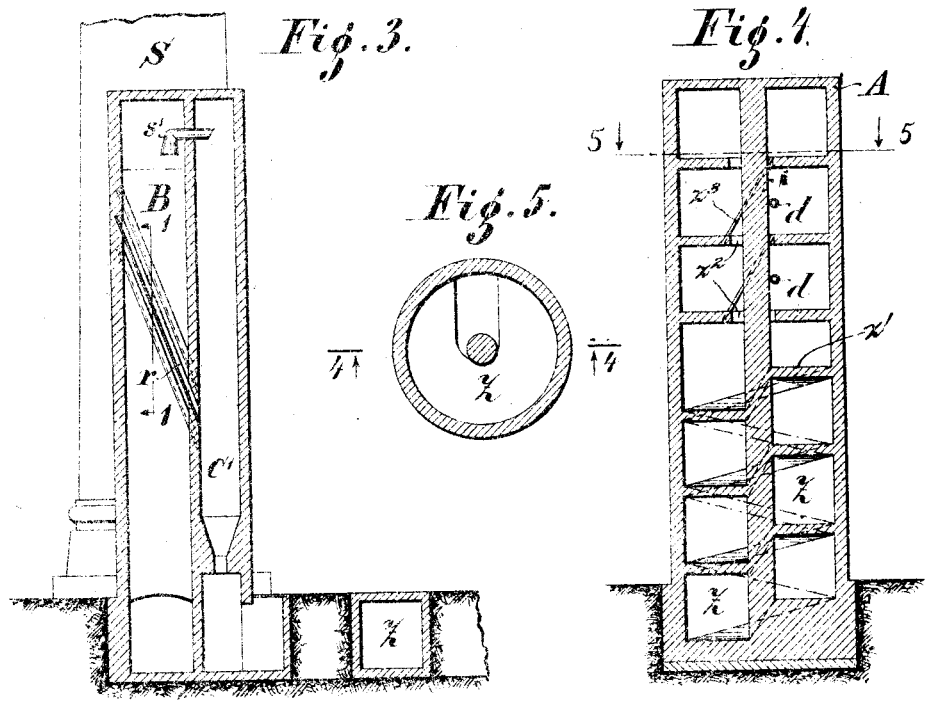

UNITED STATES PATENT OFFICE.

ARNO MÜLLER, OF LEIPZIG-SCHLEUSSIG, AND CHARLEY BOMHARD, OF BERLIN, GERMANY.

APPARATUS FOR PURIFYING GASES.

1,107,986.      Specification of Letters Patent.      Patented Aug. 18, 1914.

Application filed December 2, 1909. Serial No. 531,049.

*To all whom it may concern:*

Be it known that we, ARNO MÜLLER, engineer, a subject of the King of Saxony, whose post-office address is 5 Stieglitzstrasse, Leipzig-Schleussig, Saxony, German Empire, and CHARLEY BOMHARD, chief engineer, a subject of the King of Bavaria, whose post-office address is 7 Luitpoldstrasse, Berlin, Prussia, German Empire, have invented a new and useful Apparatus for Purifying Gases, of which the following is a specification.

The invention relates to apparatus for separating the solid constituents carried along by waste gases of all kinds, and recuperating them for further use if desired.

This invention is characterized broadly by the fact that before the waste gases enter the chimney they are conducted through a purifying apparatus, in the first member of which the gas current is given a rotary movement and the solid particles of soot or other impurities contained therein are thrown against the walls of the condenser by centrifugal action. Simultaneously these solid particles are moistened and caused to adhere to one another by means of suitably arranged spraying nozzles and the greater part of these solid particles together with the liquid is conducted from the spraying or moistening chamber into collecting chambers. In the second member of the condenser the current of gas is conducted through a system of open channels whereby any fine particles of water and solid particles which may have been carried along from the spraying chamber are drawn into the chambers formed by the channels all of which communicate with a large collector chamber, while the gases pass to the chimney.

An apparatus constructed in accordance with the invention is illustrated in the accompanying drawings, in which:—

Figure 1 is a vertical longitudinal section taken on the line 1—1 of Fig. 2. Fig. 2 is a horizontal section of the apparatus on line 2—2 of Fig. 1. Fig. 3 is a vertical section taken on the line 3—3 of Fig. 2. Fig. 4 is a transverse vertical section taken on the line 4—4 of Fig. 5. Fig. 5 is a horizontal section on line 5—5 of Fig. 4.

As shown in Fig. 1, the condenser consists broadly of a spraying or moistening chamber A, a drying chamber B and the chambers C, C' serving as collectors for the moistened impurities separated from the gas. The said principal members of the condenser may be modified constructionally in various ways according to the nature of the gases to be purified without departing from the principle of the invention.

Owing to the draft in the chimney S or in some cases by the action of fans or blowers, the waste gases are drawn through the flue Z to the bottom of the spraying chamber A, as indicated by arrows in Fig. 2. The flue ascends helically through the spraying chamber A, the number of the convolutions of the helical portion of the flue corresponding to the volume of waste gas to be dealt with. The object of these convolutions is to impart a rotary movement to the current of gas, and they communicate through the slots $e$ with the collection chambers C arranged parallel to the axis of the flue and at the periphery of the convolutions thereof. The gas rising through the convolutions will be given a spiral or rotary movement and the heavy impurities will be thrown outward by centrifugal action so as to pass through the slots $e$ into the collection chambers C, after which they gravitate to the lowermost chamber and accumulate therein until removed by any convenient or preferred means. The slots $e$ extend transversely to the spiral path of the gases through the washing chamber A and preferably parallel to the axis of said spiral path or flue. Any gas that may pass through the slots $e$ will rise in the collection chambers and return through the short pipes or nozzles $s$, the delivery ends of which extend in the direction of movement of the spiral current of gas, thus causing a suction therein, to again mingle with the main current of gas. As illustrated, the helical flue Z in the chamber A may include a lower spiral plane $z$ and a plurality of horizontal partitions $z'$ having openings $z^2$ with inclined plates $z^3$ arranged between them (see Fig. 4) for imparting the desired rotary movement to the gas.

Within the ascending portion of the flue are arranged nozzles $d$ which are adapted to spray a prepared liquid which is preliminarily heated to the temperature most suitable for combining the liquid with the particles in the soot. The liquid may be under a variable pressure and the arrangement of the nozzles is preferably such that they assist the rotary movement of the solid and liquid particles and increase the velocity of the same. It is also possible, by mixing suitable chemicals with the gases, to neutralize harmful acids.

The second part B of the purifying apparatus consists of a system of open profile channels arranged side by side or one above the other, through and about which the current of gas must pass, the said channels leading into a collecting chamber C' at the side of the chamber B. The liquid and solid particles are caught by these channels and, owing to the inclined disposition thereof are directed into the collecting chamber whereby all liquid and any solid particles still present are drawn off. Any gas that may pass into the chamber C' will rise therein and return to the chamber B via the short pipes $s^1$ having conical discharge end portions facing the channels $r$, whereby the passing of the gases through said chamber B will cause an induced current or suction through said pipes serving to accelerate the return of the gas from said chamber C'.

The operation is as follows:—The gases entering the condenser at $b$ are given a centrifugal force by their passage through the helical flue Z of the condenser and this is powerfully assisted by the action of the spraying nozzles $d$ which discharge in the direction of the movement of the gases so that all the solid particles are thrown toward the collection chamber C. At the same time by means of the prepared spray from the nozzles $d$ the solid particles in the gas are moistened and caused to adhere together to form a mud-like mass. Owing to the arrangement and construction of the purifier, the extensive adhesion surface which is absolutely necessary is formed and the products separated from the gases strike against this surface. After the current of gas has passed through the spraying chamber, it enters the drying chamber B while still in a moist condition; in this drying chamber, the current of gas by flowing past and around the open channels $r$ yields up to them the moisture still adhering and any fine particles which it may still contain; thence the condensate flows into the large chamber $C^1$ so that when it leaves the channels $r$ the current of gas passes to the chimney S in a thoroughly purified condition.

What we do claim as our invention, and desire to secure by Letters Patent of the United States, is:—

1. In apparatus for purifying waste gases, the combination with a moistening chamber, of means therein for causing a current of gas to travel an upward spiral path in passing through said chamber, an upwardly extending collection chamber at the side of said moistening chamber and communicating therewith through a slot extending transversely to the path of the gas, and a pipe connecting the upper portion of said collection chamber with said moistening chamber for returning gas which may enter the collection chamber through said slot.

2. In apparatus for purifying waste gases, the combination with a moistening chamber, of means therein for causing a current of gas to travel in a helically ascending path in passing through said chamber, an upwardly extending collection chamber at the side of said moistening chamber and communicating therewith through a slot extending transversely to the path of the gas, and a pipe connecting the upper portion of said collection chamber with said moistening chamber for returning gas which may enter the collection chamber through said slot, the delivery end of said pipe being so arranged with relation to the direction of movement of the helically ascending current of gas as to cause the latter to creater a suction in said pipe.

3. In apparatus for purifying waste gases, the combination with a moistening chamber of means therein for causing a current of gas to travel in a helically ascending path in passing through said chamber, means for supplying a moistening liquid to said chamber and a collection chamber at the side of said moistening chamber and communicating therewith through a restricted opening extending transversely to the path of the gas together with means at the upper portion of said chamber for returning gas which may enter the collection chamber through said slot.

4. In apparatus for purifying waste gases, the combination with a moistening chamber of means therein for causing a current of gas to travel in a helically ascending path in passing through said chamber, a collection chamber at the side of said moistening chamber and communicating therewith through a restricted opening extending transversely to the path of the gas, a spraying nozzle arranged to deliver its spray for assisting the helical movement of the gas and a drying chamber having its upper portion connected to the delivery end of said moistening chamber and provided with an outlet below said connection.

5. In apparatus for purifying waste gases, the combination with a moistening chamber of means therein for causing a current of gas to travel upwardly in a spiral path in passing through said chamber, a collection chamber beside said moistening chamber and communicating therewith through a slot extending transversely to the path of the gas, and means at the upper portion of said collection chamber for returning gas which may enter the collection chamber through said slot.

6. In apparatus for purifying waste gases, the combination with a moistening chamber, of means therein for imparting a rotary movement to a current of gas passing through said chamber, a spraying nozzle adapted to deliver its spray to accelerate said rotary movement, and a drying chamber having its upper portion connected with the delivery end of said moistening chamber and provided with an outlet below said connection.

7. In apparatus for purifying gases, the combination with a helically ascending flue, of a plurality of spraying nozzles arranged in different convolutions of said flue, all of said nozzles being arranged to deliver the spray for accelerating the movement of gases through said flue and a drying chamber having its upper portion connected to the delivery end of said moistening chamber and provided with an outlet below said connection.

8. In apparatus for purifying gases, the combination with a flue, of a plurality of spraying nozzles arranged in different convolutions of said flue, all of said nozzles being arranged to deliver the spray for accelerating the movement of gases through said flue, a collection chamber communicating with said flue through a slot extending transversely to the path of the gas, and means at the upper portion of said collection chamber for returning gas which may enter the collection chamber through said slot.

In testimony whereof I have hereunto set my hand in presence of two subscribing witnesses.

ARNO MÜLLER.

Witnesses:
  Rudolph Fricke,
  Southard P. Warner.

In testimony whereof I have hereunto set my hand in presence of two subscribing witnesses.

CHARLEY BOMHARD.

Witnesses:
  Woldemar Haupt,
  Henry Hasper.